United States Patent
Firth et al.

(10) Patent No.: US 9,838,371 B2
(45) Date of Patent: Dec. 5, 2017

(54) METHOD AND SYSTEM FOR SECURELY TRANSMITTING VOLUMES INTO CLOUD

(71) Applicant: Citrix Systems, Inc., Fort Lauderdale, FL (US)

(72) Inventors: Ian Firth, Cambridge (GB); Mark James Syms, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 47 days.

(21) Appl. No.: 14/609,033

(22) Filed: Jan. 29, 2015

(65) Prior Publication Data

US 2015/0264026 A1    Sep. 17, 2015

Related U.S. Application Data

(60) Provisional application No. 61/953,599, filed on Mar. 14, 2014.

(51) Int. Cl.
*H04L 29/06* (2006.01)
*G06F 17/30* (2006.01)
*G06F 9/50* (2006.01)

(52) U.S. Cl.
CPC ............ *H04L 63/08* (2013.01); *G06F 9/5072* (2013.01); *G06F 9/5077* (2013.01);
(Continued)

(58) Field of Classification Search
CPC ..... H04L 63/08; H04L 63/0823; H04L 63/20; H04L 63/205; H04L 29/06965;
(Continued)

(56) References Cited

U.S. PATENT DOCUMENTS

| | | | |
|---|---|---|---|
| 9,058,118 B1* | 6/2015 | Urkude | G06F 9/45558 |
| 2010/0169497 A1* | 7/2010 | Klimentiev | G06F 9/546 |
| | | | 709/228 |

(Continued)

FOREIGN PATENT DOCUMENTS

WO    WO 2011/159284 A1    12/2011

OTHER PUBLICATIONS

International Search Report and Written Opinion for PCT Application No. PCT/US2015/017376 dated Jun. 17, 2015, 11 pages.

*Primary Examiner* — Edward Zee
*Assistant Examiner* — Chi Nguy
(74) *Attorney, Agent, or Firm* — Foley & Lardner LLP; Christopher J. McKenna

(57) ABSTRACT

A first computing device is provided for transmitting one or more volumes via a secured connection. The first computing device includes a controller that is executable by one or more processors and is configured to instruct a cloud computing device to generate a worker virtual machine. The controller is also configured to provide authentication information to facilitate establishing of the secured connection between the controller and the worker virtual machine. The controller is further configured to instruct the cloud computing device to generate one or more target volumes associated with the cloud computing service and to associate the one or more target volumes with the worker virtual machine. The controller is further instructed to provide, irrespective of the content type of the volumes and the size of the volumes, the one or more volumes to the worker virtual machine via the secured connection.

36 Claims, 9 Drawing Sheets

(52) U.S. Cl.
CPC .. *G06F 17/30091* (2013.01); *H04L 29/06965* (2013.01); *H04L 63/0823* (2013.01)

(58) Field of Classification Search
CPC .. G06F 9/45558; G06F 9/5072; G06F 9/5077; G06F 2009/45591; G06F 2009/45562; G06F 2009/45575; G06F 2009/45587; G06F 17/30091; G06F 9/45533; G06F 2009/45583; G06F 11/301
See application file for complete search history.

(56) References Cited

U.S. PATENT DOCUMENTS

| | | | |
|---|---|---|---|
| 2011/0029973 A1 | 2/2011 | Hara et al. | |
| 2013/0298210 A1* | 11/2013 | Wright | H04L 63/0823 726/7 |
| 2014/0244808 A1* | 8/2014 | Axelrod | H04L 41/042 709/220 |
| 2015/0244707 A1* | 8/2015 | Bowen | H04L 63/0823 713/158 |
| 2015/0244802 A1* | 8/2015 | Simoncelli | H04L 67/1097 709/219 |

\* cited by examiner

METHOD AND SYSTEM FOR SECURELY TRANSMITTING VOLUMES INTO CLOUD

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

Virtualization technologies are often used in the cloud computing context. Cloud computing environments can provide computing infrastructures that are abstracted from the underlying physical hardware. Cloud computing service providers can deliver cloud computing services (e.g., Infrastructure-as-a-Service (IaaS), Platform-as-a-Service (PaaS), Software-as-a-Service (SaaS), and storage services) by providing the ability to create virtual machines on demand. Such virtual machines can have defined attributes such as size, operating system, number of block devices, etc.

In a virtualization environment, a virtual machine can be associated with one or more volumes. A volume is a virtual resource accessible by virtual machines. For example, a volume can be a virtual disk or disks. A virtual disk can have disk partitions and a file system, similar to those of a physical disk. The file system of a virtual disk can also include files and folders. A volume can be a system volume or a bootable volume, which includes disk partitions, system files, a bootable operating system, and/or software applications. A volume can also be a data storage volume, which includes user disk storing user data such as user files and folders. A volume can be used as a virtual hard disk drive of a virtual machine. For various purposes, volumes can also be transmitted from a client device (e.g., a client device with XenDesktop) to a cloud computing device (e.g., a cloud storage) provided by a cloud computing service, or vice versa.

Currently, for transmitting volumes from client devices to cloud computing devices, cloud computing service providers have different mechanisms to allow volumes to be created on the cloud computing devices. The mechanisms are usually based on templates and some predefined workflows, and can vary widely between different cloud computing service providers. For example, some service providers require push operations being performed by the client devices to inject the volume into the cloud computing devices; while other service providers require pull operations being performing by using a Universal Resource Locator (URL). Moreover some service providers may not provide any mechanism for transmitting volumes into the cloud computing devices.

Further, in some cloud computing services, virtual machines of a cloud computing device can also restrict volume transmission based on the type of content stored in the volume to be transmitted (e.g., a volume storing bootable operating system or a volume storing user data). Moreover, in some cloud computing services, if multiple volumes are required to be transmitted on a particular virtual machine and the virtual machine becomes overloaded, it may de- prioritize the request for transmitting some of the volumes and delay transmitting the volumes. Sometimes, the delay can be unacceptable (e.g., 24 hours). As a result, a client device requesting the transmission may not be able to transmit the volumes into the cloud computing devices in a timely manner or as desired.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide techniques for transmitting volumes via a secured connection to a cloud computing device. The techniques described herein can support any type of volumes including, for example, system volumes or data storage volumes. The techniques described herein can also transmit the volumes on-demand. For example, using controllers for transmitting volumes, client devices can transmit the volumes to a cloud computing device at any desired time based on a worker virtual machine and standard cloud API calls. As a result, the technique can eliminate or reduce the delay of transmission caused by overloading or unavailability of a particular virtual machine of the cloud computing devices. The techniques can also provide secured transmission of the volumes to a cloud computing device. Moreover, the techniques can enable parallel transmitting of a plurality of volumes using the same worker virtual machine of the cloud computing device.

Figure 1:
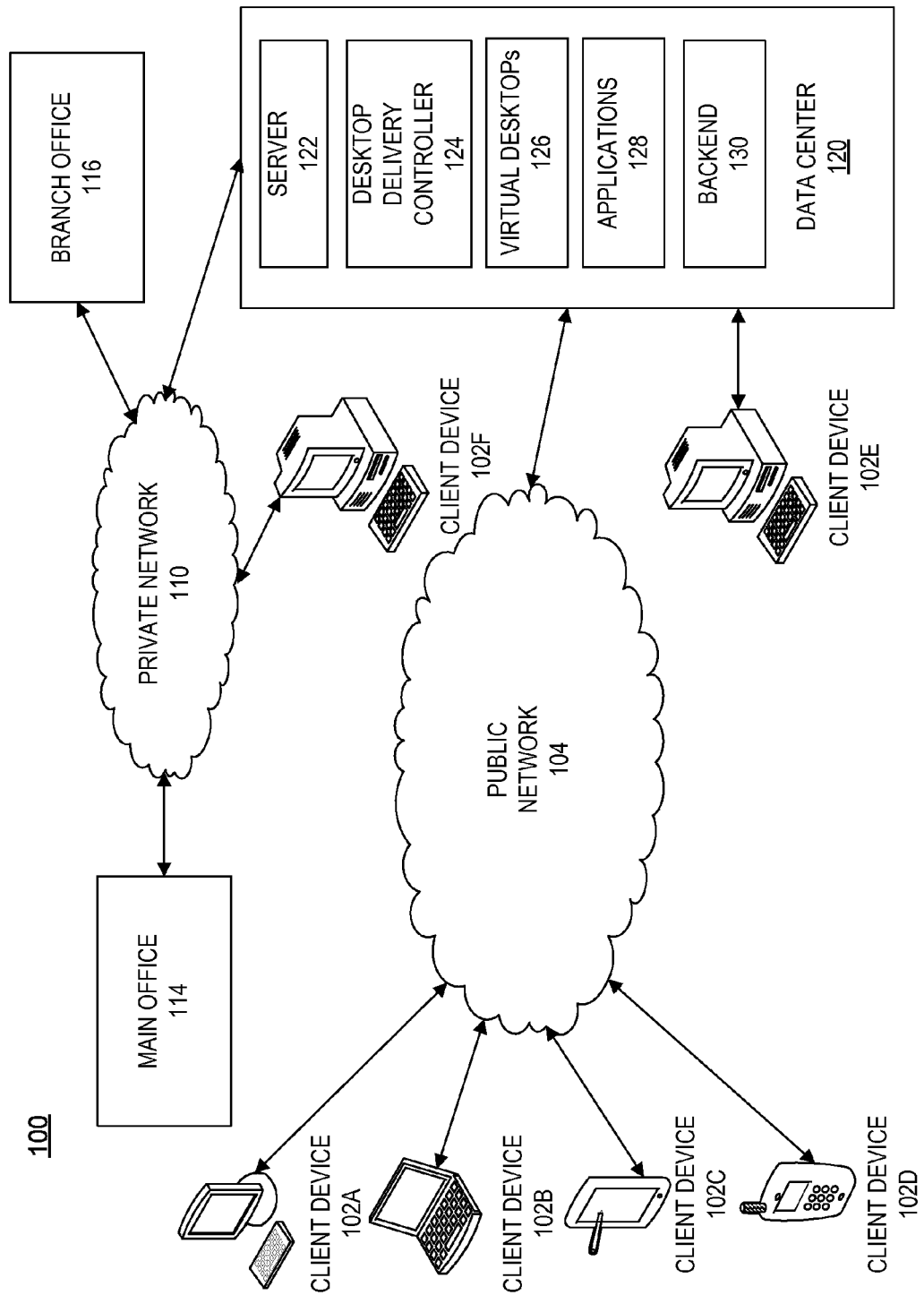
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiment, a main office 114 and a branch office 116 can also include one or more client devices that are similar to client devices 102A-F. Main office 114 can be located, for example, in a principle place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 may be owned and/or controlled by one entity (e.g., a cloud computing service provider) and made available to other entities (e.g., client devices), for example, as part of a cloud or remote storage service, an Infrastructure-as-a-Service (IaaS), a Platform-as-a-Service (PaaS), and/or a Software-as-a-Service (SaaS). Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Server 122 can also enable bootstrapping for establish secured connections, generating or instantiating virtual machines based on Application Program Interface (API) calls, and/or generating or instantiating volumes based on API calls. The API calls can be standard cloud API calls such as API calls to start a virtual machine or to create a volume. Exemplary API calls can include, for example, an HTTP command to deploy a virtual machine. Via a communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple user to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Figure 2A:
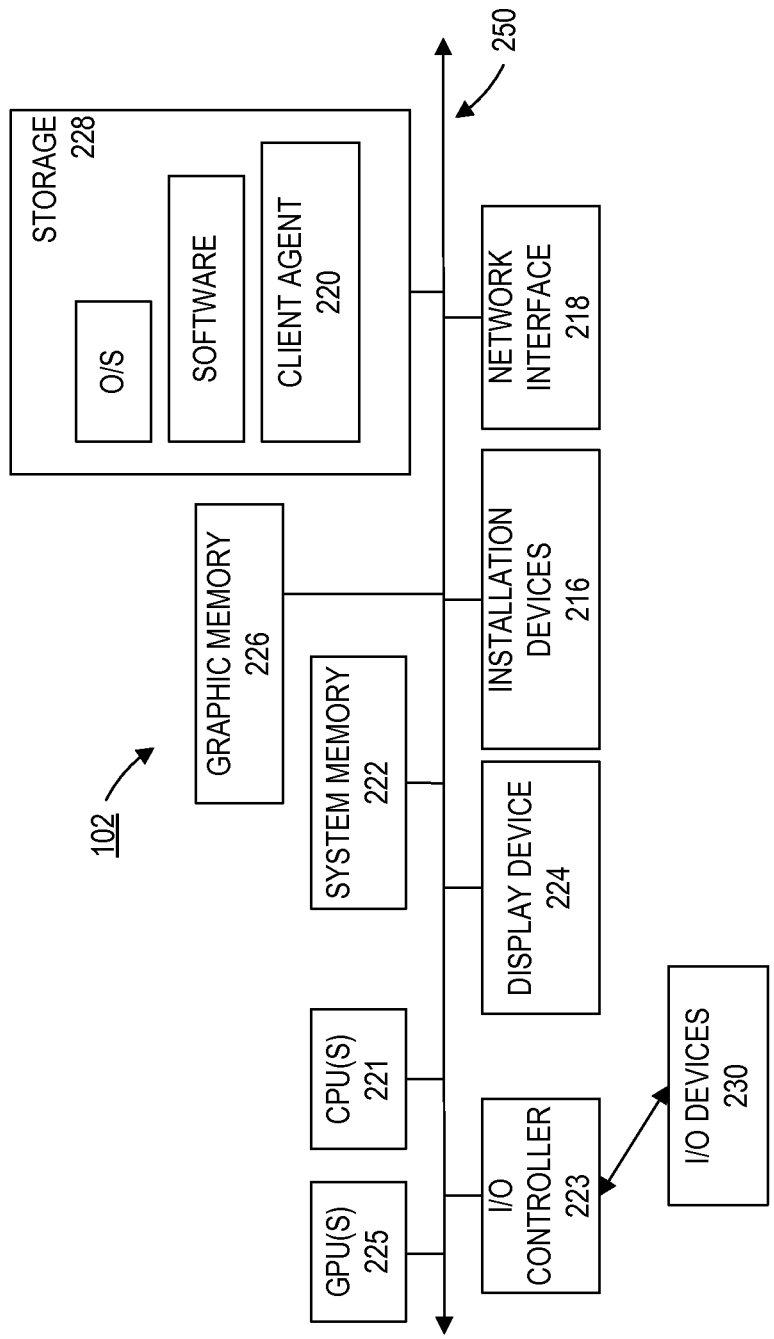
FIGS. 2A-2B are block diagrams of an exemplary computing device, consistent with embodiments of the present disclosure.
Figure 2B:
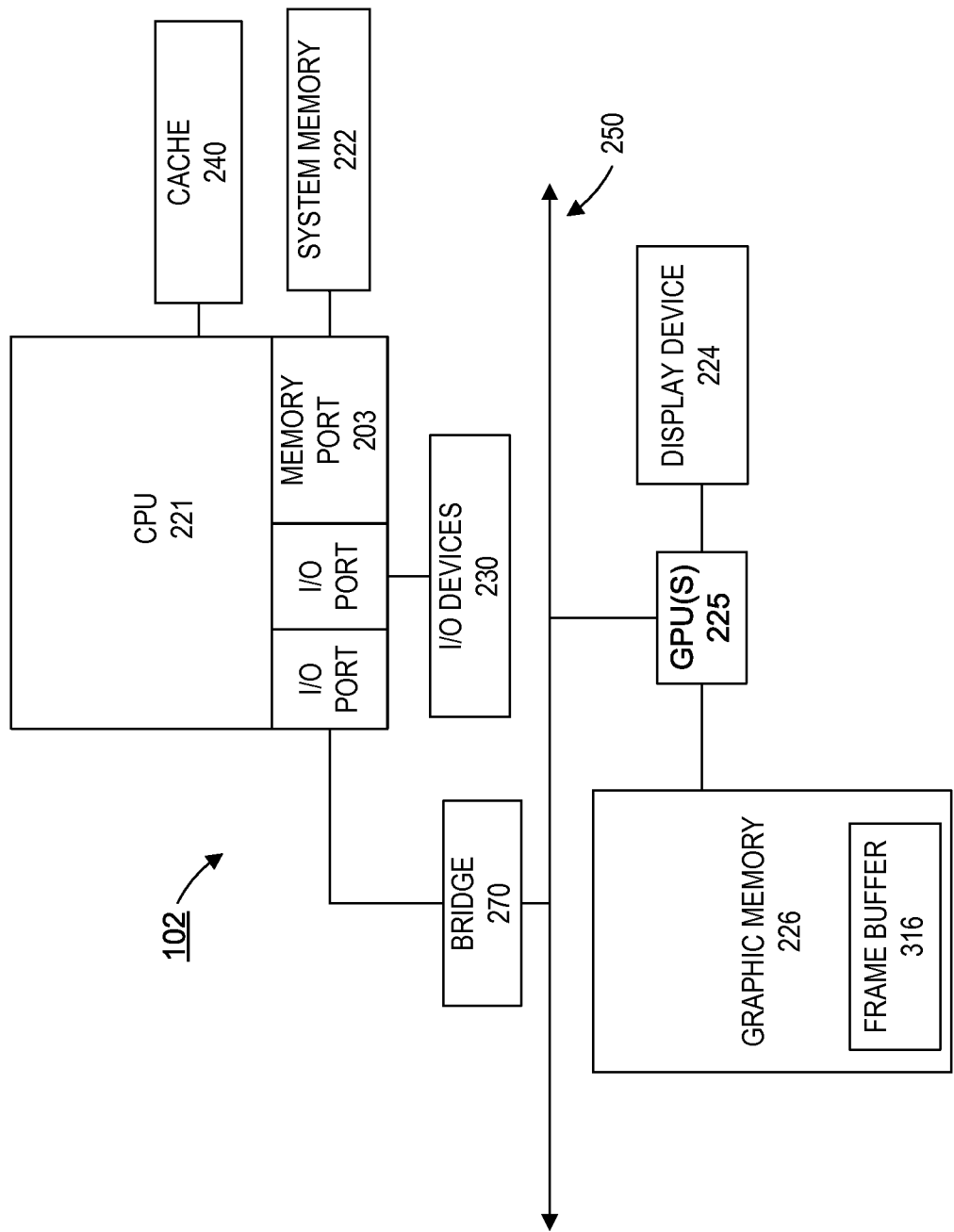

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). The memory can include a tangible and/or non-transitory computer-readable medium, such as a flexible disk, a hard disk, a CD-ROM (compact disk read-only memory), a flash drive, an MO (magneto-optical) drive, a DVD-ROM (digital versatile disk read-only memory), a DVD-RAM (digital versatile disk random-access memory), flash memory, a cache, a register, or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 222 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Client device 102 can also include display device 224 and an input/output (I/O) device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 can store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
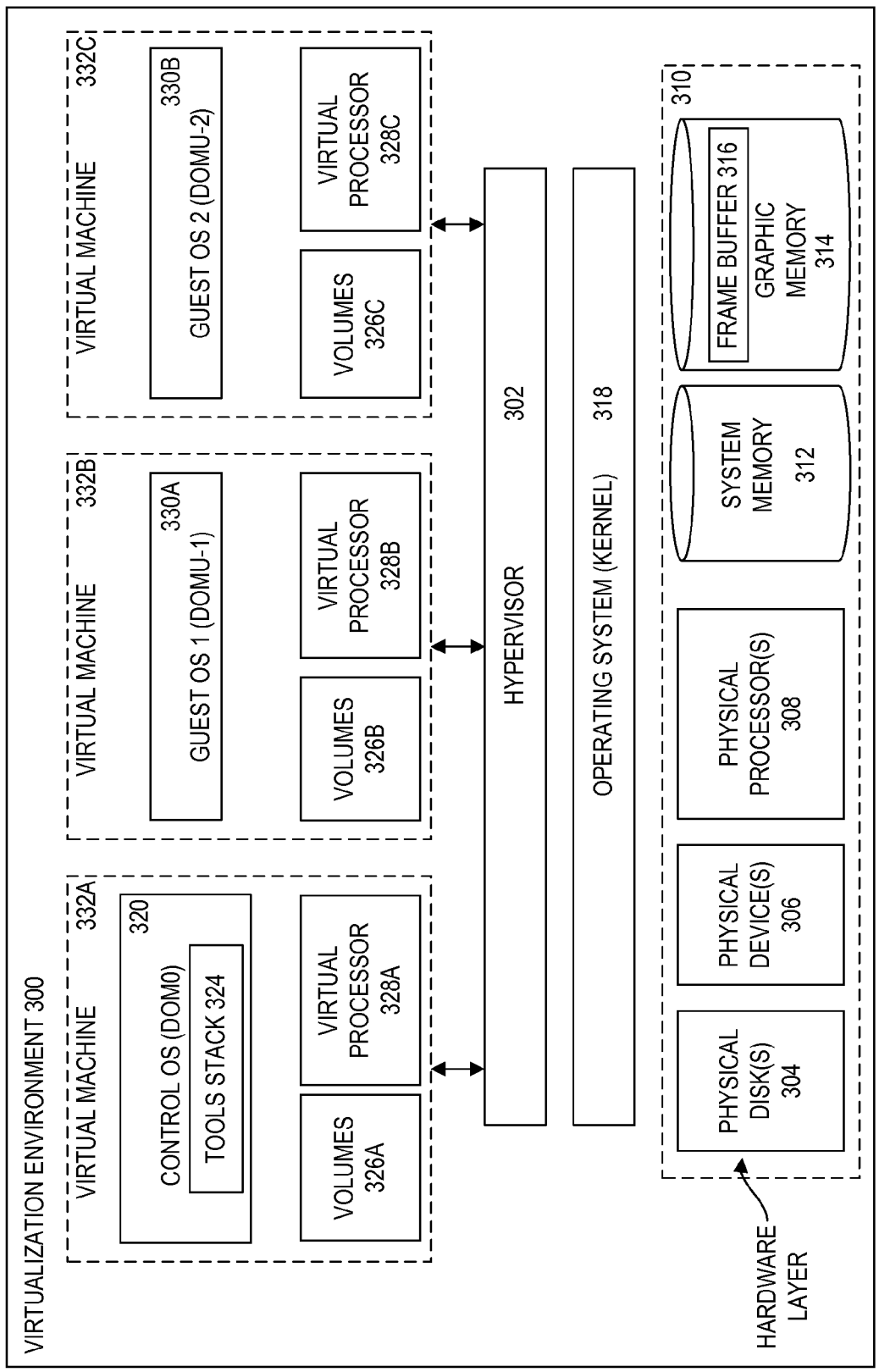
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include a computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304, one or more physical devices 306, one or more physical processors 308, a system memory 312, and a graphic memory 314. In some embodiments, frame buffer 316 can be stored within a memory element in graphic memory 314 and can be executed by one or more of physical processors 308.

Physical disk 304 can be either an internal or an external hard disk. Virtualization environment 300, in some embodiments, can communicate with an external hard disk that is included in the hardware layer 310 as a physical disk 304. Physical devices 306, in some embodiments, can be any combination of devices included in virtualization environment 300 and external devices that communicate with virtualization environment 300. Physical device 306 can be any device such as a network interface card, a video card, a keyboard, a mouse, an input device, a monitor, a display device, speakers, an optical drive, a storage device, a universal serial bus connection, any device connected to virtualization environment 300, any device communicating with virtualization environment 300, a printer, a scanner, or any other device that is desired. In some embodiments, physical processors 308 can be any processor and can include, for example, CPUs and GPUs.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics corresponding to graphical data stored in graphic memory 316 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing device. Hypervisor 302 can be stored in a memory element in system memory 312.

Hypervisor 302, in some embodiments, can provide virtual resources to one or more virtual machines, e.g., virtual machines 332A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine (e.g., virtual machines 332B-C). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machine 332A). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machine 332A-C executing in virtualization environment 300.

In some embodiments, hypervisor 302 can create virtual machines 332A-C, in which control operating system 320 or guest operating systems 330A-B execute, respectively. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, in some embodiments, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g. virtual machine 332A). This dom0 virtual machine can imitate the host operating system by allowing a user to interact with the computing device in substantially the same manner that the user would interact with the computing device via host operating system 318.

In some embodiments, virtualization environment 300 can host or execute one or more virtual machines 332A-C. As described above, a virtual machine executing a control operating system can be referred to as a dom0 virtual machine, and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more volumes 326A-C (collectively as 326). Volumes 326 can be virtual disks corresponding to, for example, one or more physical disks or a portion of a physical disk (e.g., physical disks 304). As an example, volume 326A can be allocated a first portion of physical disks 304; volume 326B can be allocated a second portion of physical disks 304; and volume 326C can be allocated a third portion of physical disks 304. In some embodiments, one or more of volumes 326A-C can include disk partitions and a file system, similar to those of a physical disk. For example, volume 326A can include a system disk, which includes disk partitions and system files associated with virtual machine 332A. In some embodiments, the system disk can be shared among virtual machines. For example, virtual machines 332B and 332C can have the same or similar system disk.

The file systems of volumes 326A-C can also include files and folders. For example, volume 326A can also include a user disk, which can store user data such as user files and folders. The user data stored on a user disk can also be referred to as persistent user data. In some embodiments, volumes, such as the system disk and/or the user disk, associated with a client device (e.g., client device 102), can be transmitted to a cloud computing device (e.g., server 122) in a data center (e.g., data center 120) and/or retrieved from the cloud computing device. In some embodiments, the transmission and/or retrieval of the volumes can be initiated by the client device via a controller. A controller can be a software application or a hardware device. The controller can reside on the client device or can be a standalone service. The controller will be described in detail below.

As shown in FIG. 3, volumes 326A-C can be associated with virtual machines 332A-C, respectively. Virtualization environment 300 can also include one or more volumes that are not associated with any particular virtual machine or associated with a worker virtual machine (not shown). In some embodiments, in virtualization environment 300, a worker virtual machine can be generated for transmitting and/or retrieving volumes that can be associated with other virtual machines. For example, a target volume that stores a volume being transmitted from a controller to a cloud computing device can be associated with a worker virtual machine during the transmission and disassociated after the transmission. The target volume can later be associated with another virtual machine that can use the content (e.g., bootable operating system images or user data) stored in the volume. Moreover, in virtualization environment 300, volumes can be associated with any virtual machine at any given time and associated with another virtual machine at another time. Volumes can also be disassociated from a virtual machine or be associated with multiple virtual machines.

In some embodiments, virtualization environment 300 can also include virtual apertures (not shown) in a virtual memory space, which can be a virtual view of the virtual memory available to virtual machines 332. The virtual apertures can correspond to for example, caches, buffers, physical memories such as system memory 312, and graphic memory 314, internal or external physical disks such as hard disk 304. As an example, under the circumstances that applications running on virtual machine 332A do not require memory more than that is available in system memory 312; the virtual apertures of virtual machine 332A can correspond to a portion of system memory 312. As another example, under the circumstances that applications executed by virtual machine 332B requires memory more than that is available in system memory 312, the virtual apertures of virtual machine 332B can correspond to one or more portions of system memory 312, graphic memory 314, or even one or more portions of physical disks 304. The virtual apertures can be generated, provided, and managed by hypervisor 302.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308.

In FIG. 3, control operating system 320 can execute at least one application for managing and configuring the guest operating systems (domUs 330, e.g. domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute an administrative application or program that can further display a user interface, which administrators can use to access the functionality of each virtual machine 332 and/or to manage each virtual machine 332. In some embodiments, the user interface generated by the administrative program can be used to terminate the execution of virtual machines 332, allocate resources to virtual machines 332, assign permissions to virtual machines 332, or manage security credentials associated with virtual machines 332.

Moreover, in some embodiments, control operating system 320 can start new virtual machines 332 or terminate execution of virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, in some embodiments, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, in some embodiments, guest operating systems 330 can provide users of virtualization environment 300 with access to resources within a computing environment. Such resources can include programs, applications, files, volumes, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4:
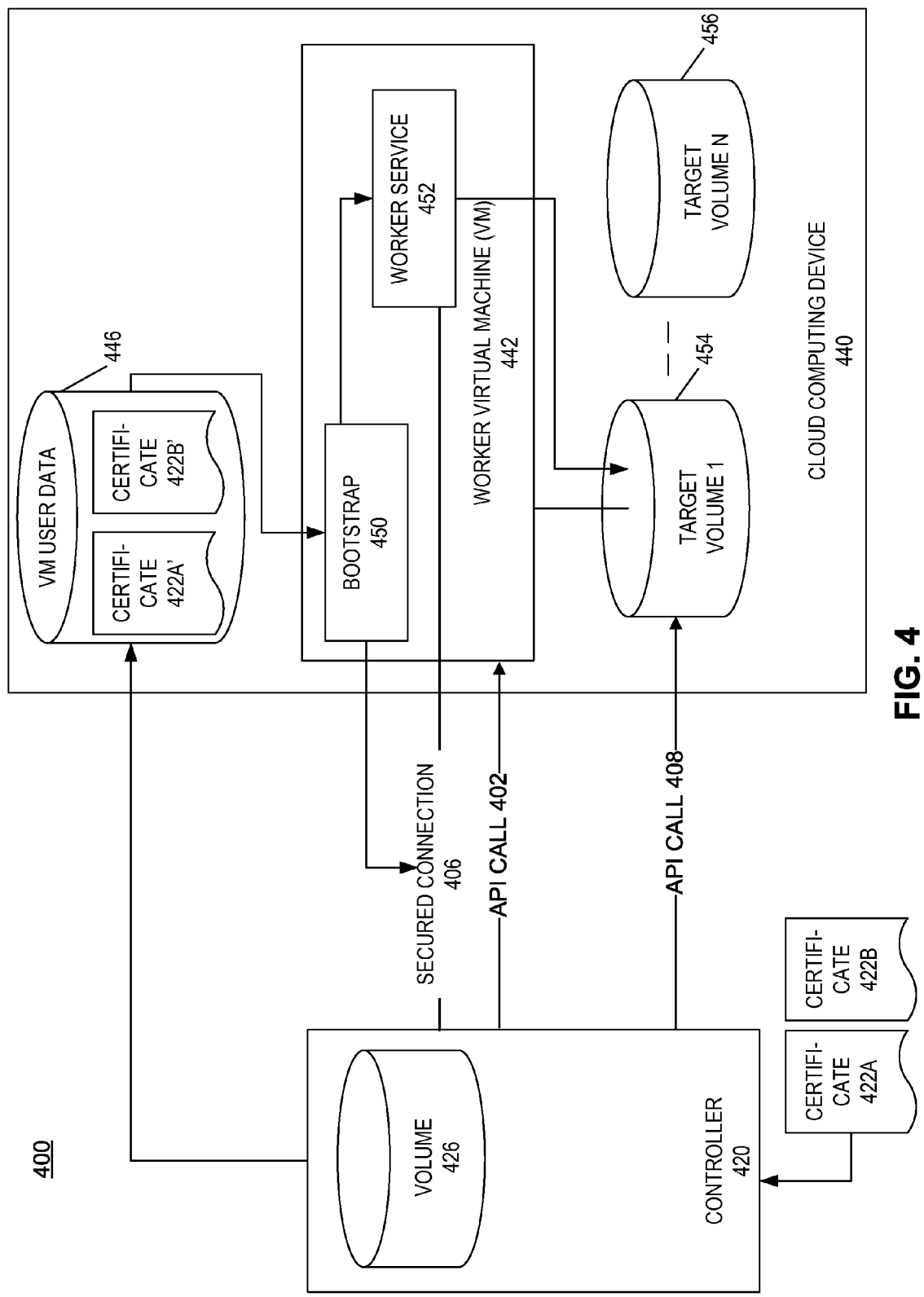
FIG. 4 is an exemplary block diagram illustrating the transmission of volumes via a secured connection, consistent with embodiments of the present disclosure.

FIG. 4 is a block diagram 400 illustrating the transmission of volumes via a secured connection, consistent with embodiments of the present disclosure. As discussed above, at any time, a client device (e.g., client device 102) can transmit or an application of the client device can require controller 420 to transmit one or more volumes to a cloud computing device 440 provided by a cloud computing service provider. The client device can perform the transmission via, for example, a controller 420. Controller 420 can be a software application and/or a hardware device that resides on the client device. For example, controller 420 can be a dynamic link library (DLL) embedded within an application, such as Citrix XenDesktop™ installed on a client device. Controller 420 can also be a standalone service with its own API (e.g., REST API—representational state transfer API).

In some embodiments, controller 420 can provide instructions to cloud computing device 440 to generate a worker virtual machine 442 (worker VM 442). Such instructions can be, for example, an API call 402. API call 402 can be a standard cloud API call, such as a cloud platform API request in the form of a HTTP GET/POST with an associated command and parameters. API call 402 can include a cloud platform API URL, which identifies cloud computing device 440 (or any cloud resources) that controller 420 desires to interact with. The command, for example, can be a command to generate or instantiate a virtual machine on cloud computing device 440. The parameters can provide further information for cloud computing device 440 to execute according to the API call.

In some embodiments, after the worker VM 442 is generated based on API call 402, worker VM 442 can provide an identification, such as an IP address, to controller 420. The IP address of worker VM 442 can be a public IP address or an internal IP address. A public IP address can be a globally routable unicast IP address, which is visible publically. An internal IP address can be routable or visible within a private network. Cloud computing devices of some cloud computing service providers can provide an internal IP address after establishing a worker VM. Controller 420 can use the identification (e.g., public IP address and/or internal IP address) for subsequent communications with worker VM 442.

After receiving API call 402, cloud computing device 440 can generate or instantiate worker VM 442. Worker VM 442 can be, for example, a dom0 or domU virtual machine (e.g., virtual machine 332A-C). In some embodiments, worker VM 442 can include a bootstrap 450 and a worker service 452. Worker VM 442 can also be associated with any number of volumes (e.g., 10 target volumes). Operation of worker VM 442 is further discussed below.

As shown in FIG. 4, based on API call 402, controller 420 can also provide authentication information. Based on the authentication information, cloud computing device 440 can mutually or unilaterally authenticate with controller 420. For example, to establish a secured connection between controller 420 and worker VM 442, controller 420 can obtain one or more certificates. In some embodiments, controller 420 can generate two sets of certificates (e.g., certificates 422A and 422B and certificates 422A' and 422B'). The two sets of certificates can be identical. For example, certificate 422A can be identical to certificate 422A' and certificate 422B can be identical to certificate 422B'. Certificates 422A and 422B can be stored in controller 420 and certificates 422A' and 422B' can be transmitted to cloud computing device 440. The certificates can be either public certificates or private certificates. For example, certificate 422A and 422A' can be private certificates for authenticating worker virtual machine 442 and certificate 422B and 422B' can be a private certificates for authenticating controller 420. In some embodiments, the certificates can be uniquely associated with the controller 420-worker virtual machine 442 pair. For example, controller 420 can provide instructions to cloud computing device 440 to generate a plurality of worker VMs (e.g., 10 worker VMs). Controller 420 can thus generate and provide a unique set of certificates for each of the plurality of worker VMs.

As discussed above, controller 420 can provide instructions to cloud computing device 440 to generate worker VM 442 via, for example, API call 402. Via the same API call 402 or a different API call, controller 420 can also instruct cloud computing device 440 to provide a VM user data 446. VM user data 446 can be a volume or a disk that enables worker VM 442 to receive private data from controller 420. For example, controller 420 can transmit certificates 422A' and 422B' to VM user data 446, based on which worker VM 442 can perform authentication.

Based on certificates 422A' and 422B' stored in VM user data 446, controller 420 and worker VM 442 can be mutually or unilaterally authenticated. For example, as discussed above, certificate 422A (and 422A') can be a private certificate for authenticating worker VM 442 and certificate 422B (and 422B') can be a private certificate for authenticating controller 420. In some embodiments, in a first handshake communication between controller 420 and worker VM 442, a bootstrap 450 can send certificate 422A' to controller 420. After receiving certificate 422A' provided by bootstrap 450, controller 420 can verify whether certificate 422A' matches with the corresponding certificate 442A stored in controller 420. If the two certificates match, worker VM 442 is authenticated by controller 420. In some embodiments, authentication of controller 420 is also required. Thus, in a second handshake communication, controller 420 can send certificate 442B to bootstrap 450 of worker VM 442. After receiving certificate 422B, bootstrap 450 of worker VM 442 can verify whether certificate 422B matches with the corresponding certificate 442B' stored in VM user data 446. If the two certificates match, controller 420 is authenticated by worker VM 442. As a result, controller 420 and worker VM 442 can be mutually authenticated.

It is appreciated that any other certificate-based authenticating mechanisms can be used to authenticate one or both of controller 420 and worker VM 442. For example, in some embodiments, only worker VM 442 is authenticated. In some embodiments, public certificates or public keys can also be used to encrypt the private certificates before the private certificates are transmitted, for example, during handshake communications. Moreover, it is also appreciated that other authenticating mechanisms, such as password or random number based authenticating mechanisms can be used to mutually or unilaterally authenticate controller 420 and/or worker VM 442.

After authentication of one or both of controller 420 and worker VM 442, bootstrap 450 can enable the initiating and performing of a self-sustaining process to establish a secured connection 406. For example, bootstrap 450 can initiate or generate a worker service 452 of worker VM 442. Bootstrap 450 and/or controller 420 can thus establish secured connection 406 between controller 420 and worker service 452. Secured connection 406 can be based on, for example, secured socket layer (SSL) protocols implemented on top of any transport layer protocols, such as transmission control protocol (TCP). SSL protocols can also be used together with application-specific protocols, such as HTTP (to form HTTPS), FTP, etc. In some embodiments, after authenticating of one or both of controller 420 and worker VM 442, a session key can be exchanged, and any data communicated between controller 420 and worker VM 442 can be encrypted based on the session key. As a result, the communication between controller 420 and worker VM 442 can be secured. As discussed above, controller 420 can provide instructions to generate a plurality of worker VMs. As a result, in some embodiments, a secured connection for each worker VM can be established between the individual worker VM and controller 420.

As shown in FIG. 4, in some embodiments, controller 420 can provide instructions to cloud computing device 440 to generate one or more target volumes (e.g., target volume 1 454 through target volume N 456). The one or more target volumes can be, for example, empty volumes that are configured to store volumes to be transmitted from controller 420 (e.g., volume 426). For example, if volume 426 contains a total of six hundred Mbytes of data, controller 420 can instruct cloud computing device 440 to generate a target volume that is one Gbytes in size or any other size that can be suitable to store the six hundred Mbytes data. Moreover, if more than one volume is to be transmitted, controller 420 can instruct cloud computing device 440 to generate a corresponding number of target volumes or any desired number of target volumes. Further, it is appreciated that, volume 426 can be any desired size and the one or more corresponding target volumes can be generated based on the size of volume 426.

In some embodiments, the instructions that controller 420 provide to cloud computing device 440 to generate one or more target volumes can include, for example, an API call 408. Similar to API call 402, API call 408 can be a standard cloud API call such as a cloud platform API request in the form of a HTTP GET/POST with an associated command and parameters. The command, for example, can be a command to generate or instantiate one or more target volumes in cloud computing device 440. The parameters can provide further information for cloud computing device 440 to execute according to API call 408.

Further, as discussed above, controller 420 can obtain an identification, such as an IP address, of worker VM 442. In some embodiments, based on the IP address, controller 420 can provide instructions to associate the one or more of target volumes (e.g., target volumes 1 454 through target volume N 456) to worker VM 442. For example, via API call 408, controller 420 can associated target volume 1 454, which is generated for storing volume 426, to worker VM 442.

After secured connection 406 is established between controller 420 and worker service 452 and one or more of target volume 1 454 through target volume N 456 are associated with worker VM 442, volume 426 can be transmitted to the corresponding one or more target volumes (e.g., target volume 1 454) via secured connection 406. As an example, via secured connection 406, controller 420 can transmit (e.g., push or inject) volume 426 to worker service 452 and worker service 452 can store volume 426 to target volume 1 454. As another example, worker service 452 can also copy volume 426 from controller 420 and store it to target volume 1 454. It is appreciated that volume 426 can be transmitted irrespective of the content type of volume 426 and the size of volume 426 (i.e., volume 426 can be an unlimited volume).

After volume 426 is transmitted and stored in target volume 1 454, controller 420 can instruct (e.g., via an API call) cloud computing device 440 to disassociate target volume 1 454 from worker VM 442. It is appreciated that controller 420 can transmit any number of volumes in any size to any of the target volumes (e.g., target volume 1 454 through target volume N 456). In some embodiments, if controller 420 determines that volumes being transmitted to a particular worker VM (e.g., worker VM 442) have reached a pre-configured threshold, controller 420 can instruct cloud computing device 440 to generate additional worker VMs and establish additional secured connections. For example, controller 420 may have fifteen volumes to be transmitted and is transmitting ten volumes to the corresponding target volumes via worker VM 442. If the pre-configured threshold of volumes for a single worker VM is ten, controller 420 can determine that no further volume will be transmitted via worker VM 442. Instead, controller 420 can instruct cloud computing device 440 to generate an additional worker VM (not shown) for transmitting the remaining five volumes.

In some embodiments, after volume 426 is transmitted to target volume 1 454, controller 420 can also receive, from cloud computing device 440, an identification (e.g., a volume ID or a disk ID) that identifies target volume 1 454, which stores volume 426. Controller 420 can store the identification of target volume 1 454 or further provide the identification to the client device or a client application that requested controller 420 to transmit volume 426. The identification can enable further operations based on target volume 1 454. Such further operations can be performed by controller 420 and/or by the client device or the client application that requested controller 420 to transmit volume 426. In some embodiments, controller 420 can also receive, from cloud computing device 440, an identification corresponding to each of the target volumes (e.g., target volume 1 454 through target volume N 456). Similarly, these identifications can enable further operations performed by controller 420 and/or client devices or client applications.

In some embodiments, based on the identification of the target volume, controller 420 can retrieve data from the target volume. As described above, after volume 426 is stored in target volume 1 454, controller 420 can receive an identification of target volume 1 454. Based on this identification, controller 420 can later retrieve the volume (e.g., volume 426) stored on target volume 1 454. For example, controller 420 can provide this identification to worker service 452, which identifies target volume 1 454 as the target volume that stores the requested volume (e.g., volume 426). Worker service 452 can thus transmit the requested volume to controller 420.

In some embodiments, controller 420 can instruct cloud computing device 440 to terminate worker VM 442. Controller 420 can also terminate or instruct cloud computing device 440 to terminate secured connection 406. Controller 420 can instruct cloud computing device 440 to terminate worker VM 442 and/or secured connection 406 based on a connection-terminating event such as a preconfigured idling time period, a preconfigured expiry time of one or more authentication certificates associated with the authentication information, a loss of power, a loss of connectivity, or a request for termination. As an example, after the transmission of volume 426 (or any additional volumes) is complete, controller 420 can determine that no additional volume is required to be transmitted and identifications of the corresponding target volumes are received. As a result, controller 420 can instruct cloud computing device 440 to terminate worker VM 442 and/or secured connection 406. As another example, controller 420 can determine that a pre-configured idling time period (e.g., a period of time that no data communication occurred between controller 420 and worker VM 442) has lapsed, and therefore instruct cloud computing device 440 to terminate worker VM 442 and/or secured connection 406. Controller 420 can also directly terminate secured connection 406. In some embodiments, controller 420 can determine that a pre-configured expiry time of one or more certificates (e.g., certificates 422A' and 422B') have lapsed or are about to lapse. As an example, if controller 420 determines that pre-configured expiry time is about to lapse, controller 420 can terminate or instruct cloud computing device 440 to terminate worker VM 442 and/or secured connection 406. Controller 420 can make an API call to terminate worker VM 442. Further, if controller 420 determines that the pre-configured expiry time has lapsed, which can indicate that the certificates have expired and are no longer valid, controller 420 can prevent a new secured connection from being initiated or established based on the expired or invalid certificates.

In some embodiments, if secured connection 406 is lost undesirably (e.g., due to loss of power, loss of network connectivity, or any other connection-terminating events), controller 420 can instruct, similarly as discussed above, cloud computing device 440 to generate a new worker VM and establish a new secured connection. The details of generating the new worker VM and establishing the new secured connection are similar to those discussed above.

Figure 5:
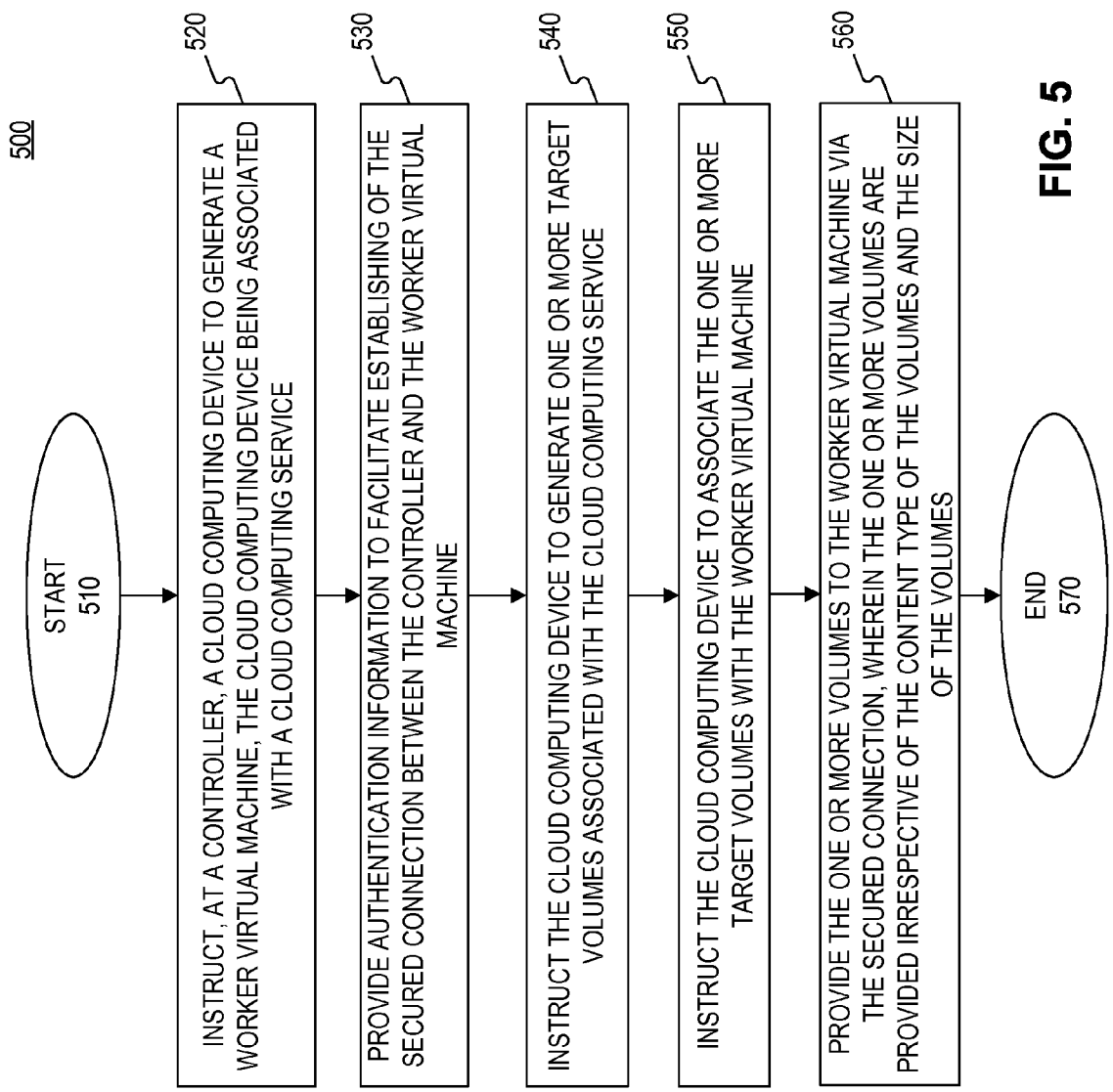
FIG. 5 is a flowchart of an exemplary method for transmitting volumes via a secured connection, consistent with embodiments of the present disclosure.

FIG. 5 is a flowchart of an exemplary method 500 for transmitting volumes via a secured connection, consistent with embodiments of the present disclosure. It will be readily appreciated that the illustrated procedure can be altered to delete steps or further include additional steps. After initial step 510, a controller (e.g., controller 420) can instruct a cloud computing device (e.g., cloud computing device 440) to generate a worker virtual machine. In some embodiments, the cloud computing device can be associated with a cloud computing service. The controller can also provide (step 530) authentication information to facilitate establishing of the secured connection between the controller and the worker virtual machine. The controller can further instruct (step 540) the cloud computing device to generate one or more target volumes associated with the cloud computing service. The controller can further instruct (step 550) the cloud computing device to associate the one or more target volumes with the worker virtual machine. The controller can further provide (step 560) the one or more volumes to the worker virtual machine. The one or more volumes can be provided irrespective of the content type of the volumes and the size of the volumes (i.e., unlimited volumes). As shown in FIG. 5, after step 560, method 500 can proceed to an end 570. Method 500 can also be repeated to transmit any number of volumes via any number of secured connections. Details of method 500 are similar to those discussed above.

Figure 6:
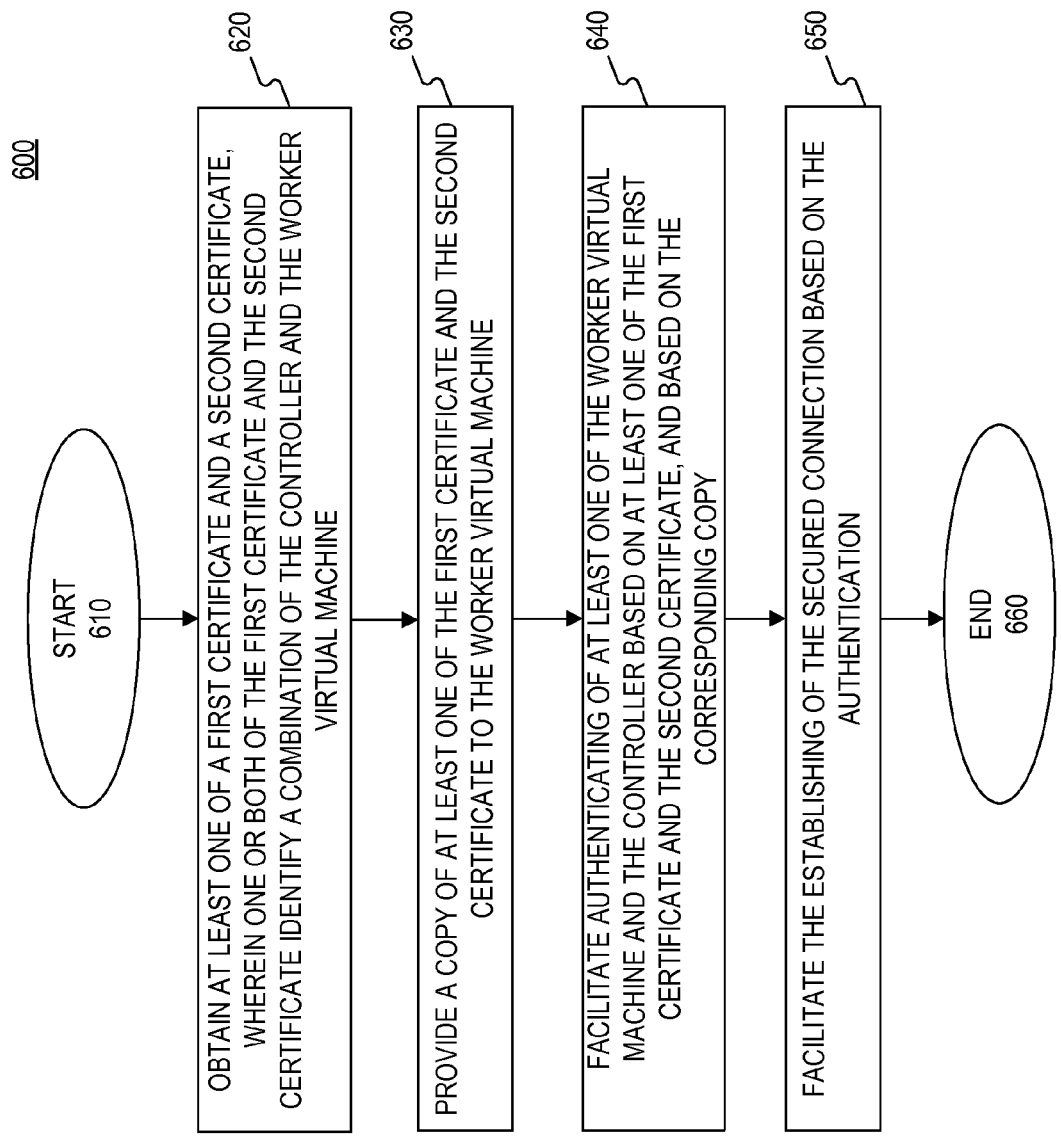
FIG. 6 is a flowchart of an exemplary method for establishing a secured connection, consistent with embodiments of the present disclosure.

FIG. 6 is a flowchart of an exemplary method 600 for establishing a secured connection, consistent with embodiments of the present disclosure. It will be readily appreciated that the illustrated procedure can be altered to delete steps or further include additional steps. After initial step 610, a controller (e.g., controller 420) can obtain (step 620) at least one of a first certificate and a second certificate. In some embodiments, one or both of the first certificate and the second certificate can identify a combination of the controller and the worker virtual machine. The controller can also provide (step 630) a copy of at least one of the first certificate and the second certificate to the worker virtual machine. The controller can further facilitate (step 640) authenticating of at least one of the worker virtual machine and the controller based on at least one of the first certificate and the second certificate, and based on the corresponding copy. For example, in a first handshake communication between the controller and the worker virtual machine, the worker virtual machine can send the copy of the first certificate to the controller. After receiving the copy of the first certificate provided by the worker virtual machine, the controller can verify whether the copy of the first certificate matches with the corresponding first certificate stored in the controller. If the two certificates match, the worker virtual machine is authenticated by the controller. In some embodiments, authentication of the controller is also required. Thus, in a second handshake communication, the controller can send the second certificate to the worker virtual machine. After receiving the second certificate, the worker virtual machine can verify whether the second certificate matches with the corresponding copy of the second certificate stored on the cloud computing device. If the two certificates match, the controller is authenticated by the worker virtual machine. As a result, the controller and the worker virtual machine can be mutually authenticated. The controller can further facilitate (step 650) the establishing of the secured connection based on the authentication. As shown in FIG. 6, after step 650, method 600 can proceed to an end 660. Method 600 can also be repeated to establish any number of secured connections. Details of method 600 are similar to those discussed above.

Figure 7:
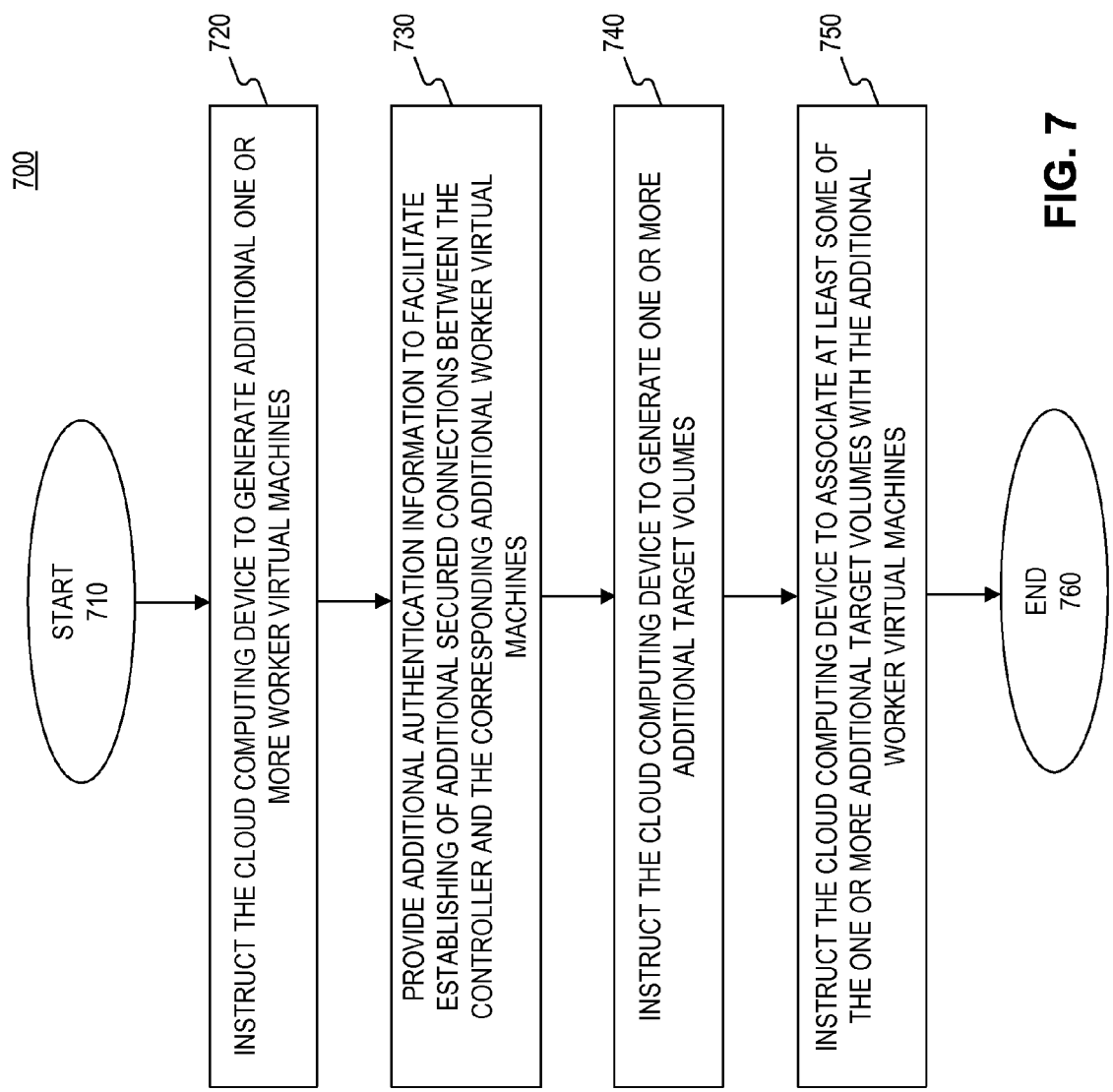
FIG. 7 is a flowchart of an exemplary method for providing additional target volumes associated with additional worker virtual machines, consistent with embodiments of the present disclosure.

FIG. 7 is a flowchart of an exemplary method 700 for providing additional target volumes associated with additional worker virtual machines, consistent with embodiments of the present disclosure. It will be readily appreciated that the illustrated procedure can be altered to delete steps or further include additional steps. After initial step 710, a controller (e.g., controller 420) can instruct (step 720) a cloud computing device (e.g., cloud computing device 440) to generate additional one or more worker virtual machines. The controller can also provide (step 730) additional authentication information to facilitate establishing of additional secured connections between the controller and the corresponding additional worker virtual machines. The controller can further instruct (step 740) the cloud computing device to generate one or more additional target volumes. The controller can further instruct (step 750) the cloud computing device to associate at least some of the one or more additional target volumes with the additional worker virtual machines. As shown in FIG. 7, after step 750, method 700 can proceed to an end 760. Method 700 can also be repeated to establish any number of secured connections. Details of method 700 can be referred to the discussion above.

Figure 8:
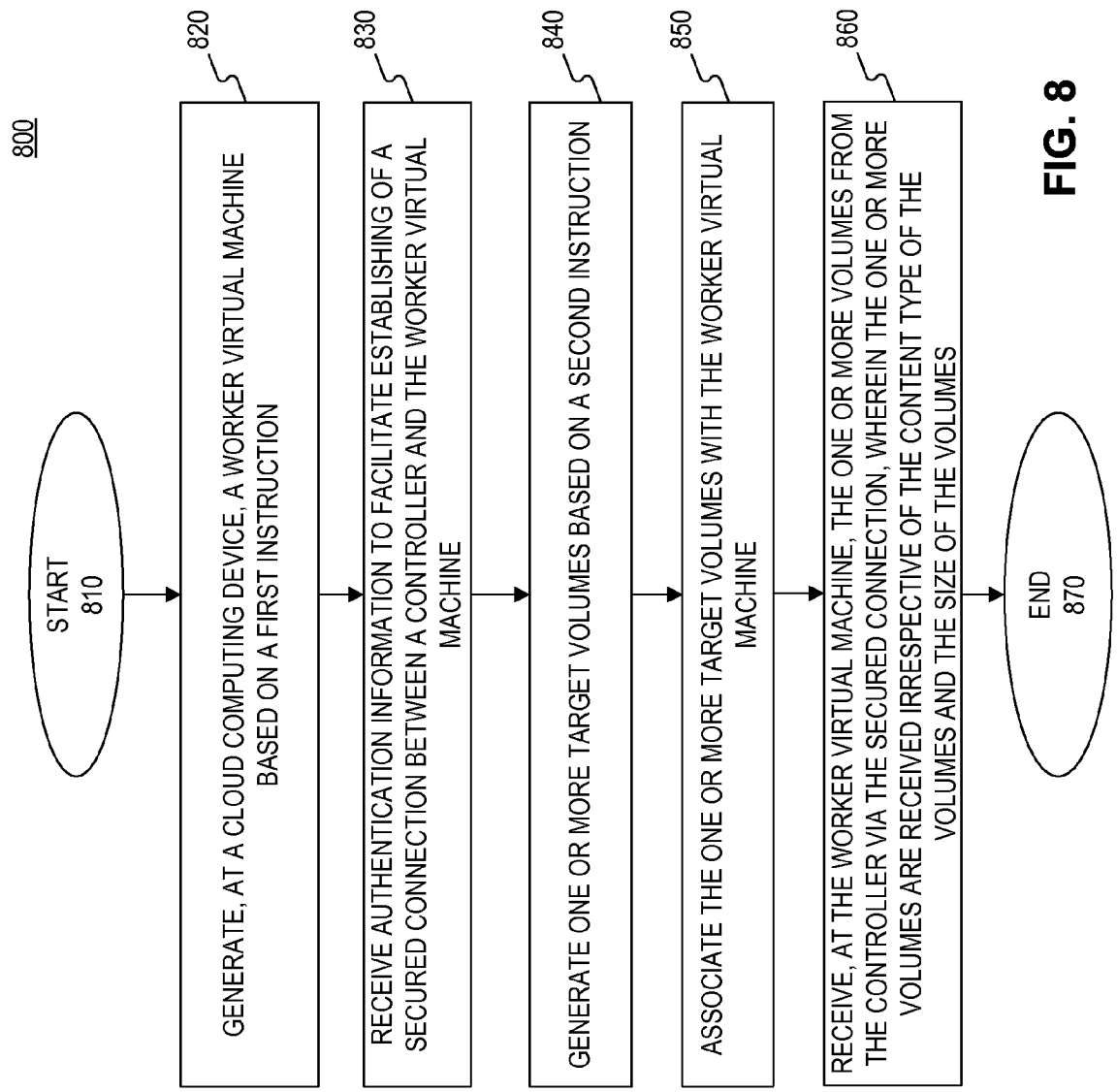
FIG. 8 is a flowchart of an exemplary method for receiving volumes via a secured connection, consistent with embodiments of the present disclosure.

FIG. 8 is a flowchart of an exemplary method 800 for receiving volumes via a secured connection, consistent with embodiments of the present disclosure. It will be readily appreciated that the illustrated procedure can be altered to delete steps or further include additional steps. After initial step 810, a cloud computing device (e.g., cloud computing device 440) can generate (step 820) a worker virtual machine based on a first instruction. The instruction can be provided by, for example, a controller (e.g., controller 420) of a first computing device. The worker virtual machine can include, for example, a bootstrap and a worker service. The cloud computing device can also receive (step 830) authentication information to facilitate establishing a secured connection between the controller and the worker virtual machine. The cloud computing device can further generate (step 840) one or more target volumes based on a second instruction. The cloud computing device can further associate (step 850) the one or more target volumes with the worker virtual machine. The cloud computing device can further receive (step 860), at the worker virtual machine, the one or more volumes from the controller via the secured connection. The one or more volumes can be received irrespective of the content type of the volumes and the size of the volumes. As shown in FIG. 8, after step 860, method 800 can proceed to an end 870. Method 800 can also be repeated to establish any number of secured connections. Details of method 800 can be referred to the discussion above.

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, or any other combination of devices or modules capable of performing media format substitution disclosed herein.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the subject matter disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A first computing device for transmitting one or more volumes via a secured connection, the first computing device comprising:
   a controller that is executable by one or more processors and is configured to:
      instruct a cloud computing device to generate a worker virtual machine, the cloud computing device being associated with a cloud computing service;
      provide authentication information to facilitate establishing of the secured connection between the controller and the worker virtual machine;
      instruct the cloud computing device to generate one or more target volumes associated with the cloud computing service;
      instruct the cloud computing device to associate the one or more target volumes with the worker virtual machine;
      provide the one or more volumes to the worker virtual machine via the secured connection;
      determine that the one or more volumes provided to the worker virtual machine exceed a pre-configured threshold; and
      responsive to the determination:
         instruct the cloud computing device to generate a second worker virtual machine;
         provide authentication information to facilitate establishing of the secured connection between the controller and the second worker virtual machine; and
         instruct the cloud computing device to associate the one or more volumes exceeding the pre-configured threshold with the second worker virtual machine.

2. The first computing device of claim 1, wherein the one or more volumes comprise at least one of: a system volume and a data storage volume, wherein the system volume includes a bootable operating system and one or more software applications, and wherein the data storage volume includes user data to be stored on the cloud computing device.

3. The first computing device of claim 1, wherein the worker virtual machine stores the one or more volumes to the one or more corresponding target volumes associated with the worker virtual machine.

4. The first computing device of claim 1, wherein the controller is configured to instruct the cloud computing device to generate the worker virtual machine using an application programming interface (API) call.

5. The first computing device of claim 1, wherein the cloud computing service comprises at least one of: a cloud data storage service, an infrastructure-as-a-service, a platform-as-a-service, or a software-as-a-service.

6. The first computing device of claim 1, wherein the controller that is configured to provide the authentication information to facilitate establishing of the secured connection is further configured to:
obtain at least one of a first certificate and a second certificate, wherein one or both of the first certificate and the second certificate identify a combination of the controller and the worker virtual machine;
provide a copy of at least one of the first certificate and the second certificate to the worker virtual machine;
facilitate authenticating of at least one of the worker virtual machine and the controller based on at least one of the first certificate and the second certificate, and based on the corresponding copy; and
facilitate the establishing of the secured connection based on the authentication.

7. The first computing device of claim 1, wherein establishing of the secured connection is based on a secure socket layer protocol.

8. The first computing device of claim 1, wherein the secured connection terminates based on a connection-terminating event that includes at least one of a preconfigured idling time period, a preconfigured expiry time of one or more authentication certificates associated with the authentication information, a loss of power, a loss of connectivity, or a request for termination.

9. The first computing device of claim 1, wherein the controller is further configured to instruct the cloud computing device to perform at least one of:
disassociate at least one of the one or more target volumes with the worker virtual machine; and
associate at least one additional target volume with the worker virtual machine.

10. The first computing device of claim 1, wherein the controller is further configured to receive one or more identifications identifying the one or more target volumes from the cloud computing device.

11. The first computing device of claim 1, wherein the controller is further configured to instruct the cloud computing device to retrieve at least one of the one or more volumes stored in the one or more target volumes.

12. The first computing device of claim 1, further comprising a storage configured to store the one or more volumes.

13. A method for transmitting one or more volumes via a secured connection, the method being performed by a controller of a first computing device that includes one or more processors, the method comprising:
instructing a cloud computing device to generate a worker virtual machine, the cloud computing device being associated with a cloud computing service;
providing authentication information to facilitate establishing of the secured connection between the controller and the worker virtual machine;
instructing the cloud computing device to generate one or more target volumes associated with the cloud computing service;
instructing the cloud computing device to associate the one or more target volumes with the worker virtual machine;
providing the one or more volumes to the worker virtual machine via the secured connection;
determining that the one or more volumes provided to the worker virtual machine exceed a pre-configured threshold; and
responsive to the determination:
instructing the cloud computing device to generate a second worker virtual machine;
providing authentication information to facilitate establishing of the secured connection between the controller and the second worker virtual machine; and
instructing the cloud computing device to associate the one or more volumes exceeding the pre-configured threshold with the second worker virtual machine.

14. The method of claim 13, wherein the one or more volumes comprise at least one of: a system volume and a data storage volume, wherein the system volume includes a bootable operating system and one or more software applications, and wherein the data storage volume includes user data to be stored on the cloud computing device.

15. The method of claim 13, wherein the worker virtual machine stores the one or more volumes to the one or more corresponding target volumes associated with the worker virtual machine.

16. The method of claim 13, further comprising instructing the cloud computing device to generate the worker virtual machine using an application programming interface (API) call.

17. The method of claim 13, wherein the cloud computing service comprises at least one of: a cloud data storage service, an infrastructure-as-a-service, a platform-as-a-service, or a software-as-a-service.

18. The method of claim 13, wherein providing the authentication information to facilitate establishing of the secured connection comprises:
obtaining at least one of a first certificate and a second certificate, wherein one or both of the first certificate and the second certificate identify a combination of the controller and the worker virtual machine;
providing a copy of at least one of the first certificate and the second certificate to the worker virtual machine;
facilitating authenticating of at least one of the worker virtual machine and the controller based on at least one of the first certificate and the second certificate, and based on the corresponding copy; and
facilitating the establishing of the secured connection based on the authentication.

19. The method of claim 13, wherein establishing of the secured connection is based on a secure socket layer protocol.

20. The method of claim 13, wherein the secured connection terminates based on a connection-terminating event that includes at least one of a preconfigured idling time period, a preconfigured expiry time of one or more authentication certificates associated with the authentication information, a loss of power, a loss of connectivity, or a request for termination.

21. The method of claim 13, further comprising instructing the cloud computing device to perform at least one of:
disassociating at least one of the one or more target volumes with the worker virtual machine; and
associating at least one additional target volume with the worker virtual machine.

22. The method of claim 13, furthering comprising receiving one or more identifications identifying the one or more target volumes from the cloud computing device.

23. The method of claim 13, further comprising instructing the cloud computing device to retrieve at least one of the one or more volumes stored in the one or more target volumes.

24. The method of claim 13, further comprising storing the one or more volumes in a storage.

25. A non-transitory computer readable storage medium storing instructions that are executable by a first computing device that includes one or more processors to cause a controller of the first computing device to perform a method for transmitting one or more volumes via a secured connection, the method comprising:
    instructing a cloud computing device to generate a worker virtual machine, the cloud computing device being associated with a cloud computing service;
    providing authentication information to facilitate establishing of the secured connection between the controller and the worker virtual machine;
    instructing the cloud computing device to generate one or more target volumes associated with the cloud computing service;
    instructing the cloud computing device to associate the one or more target volumes with the worker virtual machine;
    providing the one or more volumes to the worker virtual machine via the secured connection;
    determining that the one or more volumes provided to the worker virtual machine exceed a pre-configured threshold; and
    responsive to the determination:
        instructing the cloud computing device to generate a second worker virtual machine;
        providing authentication information to facilitate establishing of the secured connection between the controller and the second worker virtual machine; and
        instructing the cloud computing device to associate the one or more volumes exceeding the pre-configured threshold with the second worker virtual machine.

26. The computer readable medium of claim 25, wherein the one or more volumes comprise at least one of: a system volume and a data storage volume, wherein the system volume includes a bootable operating system and one or more software applications, and wherein the data storage volume includes user data to be stored on the cloud computing device.

27. The computer readable medium of claim 25, wherein the worker virtual machine stores the one or more volumes to the one or more corresponding target volumes associated with the worker virtual machine.

28. The computer readable medium of claim 25, further comprising instructions that are executable by the first computing device that includes one or more processors to cause the controller of the first computing device to perform:
    instructing the cloud computing device to generate the worker virtual machine using an application programming interface (API) call.

29. The computer readable medium of claim 25, wherein the cloud computing service comprises at least one of: a cloud data storage service, an infrastructure-as-a-service, a platform-as-a-service, or a software-as-a-service.

30. The computer readable medium of claim 25, wherein providing the authentication information to facilitate establishing of the secured connection comprises:
    obtaining at least one of a first certificate and a second certificate, wherein one or both of the first certificate and the second certificate identify a combination of the controller and the worker virtual machine;
    providing a copy of at least one of the first certificate and the second certificate to the worker virtual machine;
    facilitating authenticating of at least one of the worker virtual machine and the controller based on at least one of the first certificate and the second certificate, and based on the corresponding copy; and
    facilitating the establishing of the secured connection based on the authentication.

31. The computer readable medium of claim 25, wherein establishing of the secured connection is based on a secure socket layer protocol.

32. The computer readable medium of claim 25, wherein the secured connection terminates based on a connection-terminating event that includes at least one of a preconfigured idling time period, a preconfigured expiry time of one or more authentication certificates associated with the authentication information, a loss of power, a loss of connectivity, or a request for termination.

33. The computer readable medium of claim 25, further comprising instructions that are executable by the first computing device that includes one or more processors to cause the controller of the first computing device to instruct the cloud computing device to perform at least one of:
    disassociating at least one of the one or more target volumes with the worker virtual machine; and
    associating at least one additional target volume with the worker virtual machine.

34. The computer readable medium of claim 25, further comprising instructions that are executable by the first computing device that includes one or more processors to cause the controller of the first computing device to perform:
    receiving one or more identifications identifying the one or more target volumes from the cloud computing device.

35. The computer readable medium of claim 25, further comprising instructions that are executable by the first computing device that includes one or more processors to cause the controller of the first computing device to perform:
    instructing the cloud computing device to retrieve at least one of the one or more volumes stored in the one or more target volumes.

36. The computer readable medium of claim 25, further comprising instructions that are executable by the first computing device that includes one or more processors to cause the controller of the first computing device to perform:
    storing the one or more volumes in a storage.

* * * * *